(12) United States Patent
Smartt et al.

(10) Patent No.: US 10,291,466 B2
(45) Date of Patent: May 14, 2019

(54) COMPUTING INFRASTRUCTURE PROVISIONING

(71) Applicant: HEWLETT PACKARD ENTERPRISE DEVELOPMENT LP, Houston, TX (US)

(72) Inventors: Jared Allen Smartt, Fort Collins, CO (US); Matthew Frahry, Roseville, CA (US); Gunjan Kamle, Roseville, CA (US); Andrew Claiborne, Fort Collins, CO (US); Phil Prasek, Bellevue, WA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 396 days.

(21) Appl. No.: 15/139,765

(22) Filed: Apr. 27, 2016

(65) Prior Publication Data
US 2017/0317881 A1 Nov. 2, 2017

(51) Int. Cl.
*G06F 15/177* (2006.01)
*H04L 12/24* (2006.01)
*G06F 12/00* (2006.01)

(52) U.S. Cl.
CPC .......... *H04L 41/0806* (2013.01); *G06F 12/00* (2013.01)

(58) Field of Classification Search
CPC ..... H04L 67/10; H04L 63/20; H04L 67/1097; H04L 41/0893; H04L 41/5054; H04L 41/22; H04L 63/0861; H04L 63/102; H04L 63/105; H04L 41/0803; H04L 41/0843; G06F 9/45558; G06F 8/60; G06F 1/3287; G06F 11/30
See application file for complete search history.

(56) References Cited

U.S. PATENT DOCUMENTS

| 9,021,479 B2 | 4/2015 | Brant et al. | |
| 2012/0158920 A1* | 6/2012 | Yang | G06F 8/61 709/220 |
| 2012/0266156 A1* | 10/2012 | Spivak | G06F 9/5055 717/172 |

(Continued)

FOREIGN PATENT DOCUMENTS

GB    2522031    7/2015

OTHER PUBLICATIONS

John Keiser, "Chef Provisioning: Infrastructure as Code", Chef, Nov. 12, 2014, 7 pages. https://www.chef.io/blog/2014/11/12/chef-provisioning-infrastructure-as-code/.

(Continued)

*Primary Examiner* — Michael A Keller
*Assistant Examiner* — Thao D Duong
(74) *Attorney, Agent, or Firm* — Brooks, Cameron & Huebsch, PLLC

(57) ABSTRACT

According to an example, a provisioning management system receives an infrastructure code definition including a description of computing infrastructure, and determines, based on the infrastructure code definition, configuration instructions usable by computer resource management systems for provisioning the computing infrastructure. The configuration instructions are provided to the computer resource management systems to facilitate the provisioning of the computing infrastructure.

14 Claims, 5 Drawing Sheets

(56) References Cited

U.S. PATENT DOCUMENTS

| | | | | |
|---|---|---|---|---|
| 2013/0132950 A1* | 5/2013 | McLeod | ............... | G06F 8/63 |
| | | | | 718/1 |
| 2013/0311763 A1* | 11/2013 | Saborowski | ............ | G06F 9/445 |
| | | | | 713/2 |
| 2015/0019742 A1 | 1/2015 | Douglas et al. | | |
| 2015/0350021 A1* | 12/2015 | Morris | ............... | H04L 41/0816 |
| | | | | 709/224 |
| 2017/0005865 A1* | 1/2017 | Liu | ................ | H04L 41/0843 |

OTHER PUBLICATIONS

Opscode, "Opscode Chef™ Delivers Robust Open Source Automation Platform for Windows Environments", Aug. 19, 2013, Seattle, 7 pages. http://www.prnewswire.com/news-releases/.

Paul Duvall, "Agile Devops: Infrastructure Automation", IBM, Sep. 11, 2012, 8 pages. http://www.ibm.com/developerworks/library/a-devops2/.

Pradeepto Bhattacharya, "Orchestrating Your Infrastructure Fleet with Chef Provisioning", Apr. 8, 2015, 8 pages. http://clogeny.com/2015/04/08/orchestrating-infrastructure-with-chef-provisioning/.

* cited by examiner

```
machine 'web01' do
  infrastructure code definition 'my_apache_server::default'
  machine_options :driver_options => {
    :server_template => 'Web Server Template',
    :os_build => 'RHEL-6.5-x64',
    :host_name => 'web01',
    :dhcp => true,
  },
  :transport_options => {
    :ssh_options => {
      :password => 'password123' } },
  environment '_default'
  converge true
end
```

FIG. 2

COMPUTING INFRASTRUCTURE PROVISIONING

BACKGROUND

Data centers may utilize a pool of computing resources that can be used to run software applications and perform other tasks. The pool of computing resources may include servers, network devices, data storage, and other hardware and software. Commonly, computing resources in the data center may be provisioned as needed to accommodate the workload of the data center. Provisioning may involve processes for configuring hardware, and installing appropriate software, and generally making computing resources ready for operation to run workloads. Provisioning processes may be performed to initially deploy computing resources in the data center, and may be repeated when re-allocating the computing resources to accommodate variations in the workload of the data center.

BRIEF DESCRIPTION OF THE DRAWINGS

Features of the present disclosure are illustrated by way of example and not limited in the following figure(s), in which like numerals indicate like elements, and in which:

FIG. 2 shows an infrastructure code definition, according to an example of the present disclosure;

DETAILED DESCRIPTION

Figure 1:
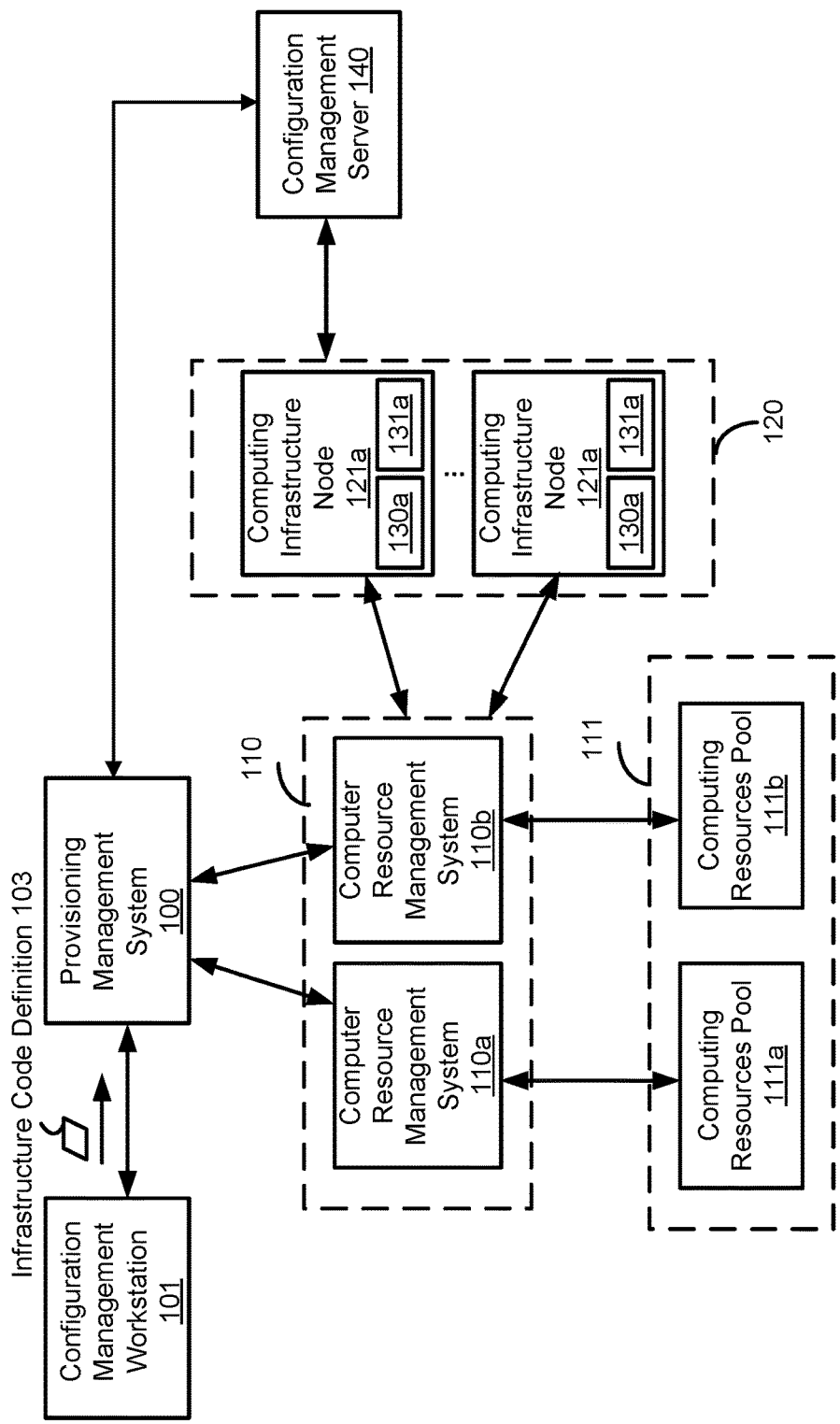
FIG. 1 shows a provisioning management system interfacing with multiple systems to provision computing resources, according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. In the present disclosure, the term "includes" means includes but not limited thereto, the term "including" means including but not limited thereto. The term "based on" means based at least in part on. In addition, the terms "a" and "an" are intended to denote at least one of a particular element.

According to an example of the present disclosure, a provisioning management system can interface with a configuration management tool and multiple computer resource management systems to provision desired computing resources. The provisioning management system may interface with the configuration management tool to receive infrastructure code definitions, which include a description of desired computing resources to be provisioned. Based on the code definitions, the provisioning management system may determine provisioning instructions that are compatible with the computer resource management systems, and facilitate the provisioning of the desired computing resources by the computer resource management systems. An infrastructure code definition may include a description of desired computing resources, and the description may be provided in the syntax of a computer language. The infrastructure code definition may include a description of hardware and/or software to be provisioned. Computing resources may include hardware and software that can be provisioned according to the infrastructure code definition. For example, the computing resources may include servers, network hardware, storage hardware, firmware, operating systems, software applications, etc., which may be managed by one or more computing resource management systems, and provisioned by the computing resource management systems as needed. As used herein, "software," "software application," and "firmware" can comprise machine-readable instructions executable by a processor.

Managing computing resources and going through the provisioning and configuration processes manually can be extremely time-consuming and error-prone. The provisioning management system can utilize the infrastructure code definitions for provisioning, which provide an easy way for users to describe desired computing resources. Furthermore, provisioning of computing resources may involve multiple computing resource management systems managing the computing resources that can be provisioned. A user or a computer may invoke provisioning of desired computing resources by providing infrastructure code definition(s) to the provisioning management system, without having to manually interact with each of the computing resource management systems. Additionally, for frequently repeated provisioning tasks, such as configuring hardware, installing operating systems, and other configuring tasks performed on hardware and software, the provisioning management system can perform these tasks in a scalable fashion with minimal manual operation, and without requiring development and execution of complex scripts for each provisioning task. The provisioning management system can facilitate the building of computing infrastructure from pools of computing resources the same way multiple times, and minimizes risks of human error. In addition, the provisioning management system may enable quick composition and decomposition of a computing infrastructure built from managed computing resources, and may perform the composition and decomposition in parallel.

FIG. 1 illustrates a provisioning management system 100 interfacing with multiple systems to provision computing resources. A configuration management workstation 101 may be used to create infrastructure code definitions. The configuration management workstation 101 may include a computer loaded with configuration management software that creates infrastructure code definitions to provision computing resources. In an example, a user may provide input to the configuration management workstation 101 to create an infrastructure code definition 103, which describes desired computing infrastructure. The configuration management workstation 101 may send the infrastructure code definition 103 to the provisioning management system 100 to facilitate the provisioning of computing resources to create computing infrastructure 120. For example, the provisioning management system 100 may determine, based on the infrastructure code definition 103, configuration instructions usable by computer resource management systems 110 to provision computing resources from pools of computing resources 111 to create the desired computing infrastructure. According to an example, the infrastructure code definition 103 may be provided in a computer language. For example, the infrastructure code definition 103 may be provided in Extensible Markup Language (XML), JAVA, or some other high-level or low-level programming language or a scripting language. An example of the infrastructure code definition 103 is shown in FIG. 2. The infrastructure code definition 103 may comprise machine-readable instructions executable by a processor of a computing device to perform operations in accordance with examples described herein. The provisioning management system 100, modules and other various components described herein may be implemented using hardware or hardware in combination with software.

The provisioning management system 100 may communicate with one or multiple computer resource management systems 110 to provision computing resources. FIG. 1 shows, by way of example, the provisioning management system 100 communicating with computer resource management systems 110*a-b* to provision computing resources to create the computing infrastructure 120. The computer resource management systems 110*a-b* manage computing resources which may be provided as computing resource pools 111*a-b*. In an example, the computing resource pools 111*a-b* may include different types of computing resources. For example, the computing resource pools 111*a* may include hardware, such as hardware for servers, hardware for storage systems, network hardware, etc., and the computing resource pools 111*b* may include software, such as operating systems, drivers, hardware management utilities, firmware for servers, basic input/output system (BIOS), etc. The computer resource management systems 110 may manage the computing resources in the computing resource pools 111, for example, by keeping track of available and provisioned computing resources, allocating computing resources from the computing resource pools 111, un-allocating computing resources, and returning computing resources to the computing resource pools 111, configuring allocated hardware and software to create operational machines, etc.

The computing infrastructure 120 is the desired computing infrastructure provisioned according to the infrastructure code definition 103. The infrastructure code definition 103 may include multiple infrastructure code definitions. The computing infrastructure 120, for example, includes computing resources from the computing resource pools 111 that are provisioned by the computer resource management systems 110. In an example, the computing infrastructure 120 may include computing infrastructure nodes 121*a-n* comprised of hardware and software. In an example, the computing infrastructure nodes 121*a-n* may include servers installed with operating systems and software applications. The servers may include virtual machines. Any suitable number of computing infrastructure nodes may be provisioned.

According to an example, the hardware and operating system are provisioned and made operational by the computer resource management systems 110, and then software applications are subsequently installed by another system. For example, after the hardware and operating system are provisioned and made operational for the computing infrastructure nodes 121*a-n*, a configuration management client (shown as 130*a-n*) may be installed on each of the computing infrastructure nodes 121*a-n*. The configuration management clients 130*a-n* may include machine-readable instructions that interact with a configuration management computer, such as configuration management server 140, to further configure the computing infrastructure nodes 121*a-n*. For example, the provisioning management system 100 may send instructions, e.g., including code to install the configuration management client, authentication keys, and an Internet Protocol (IP) address of the configuration management server 140, to the computing infrastructure nodes 121*a-n*. Once the configuration management clients 130*a-n* are installed and the proper authentication keys are in place, the configuration management clients 130*a-n* may communicate with the configuration management server 140 to install software applications 131*a-n* on the computing infrastructure nodes 121*a-n*. The software applications to install on the computing infrastructure nodes 121*a-n* may be specified in the infrastructure code definition 103, which may be provided to the configuration management server 140 from the configuration management workstation 101 or from the provisioning management system 100 which receives the infrastructure code definition 103 from the configuration management workstation 101.

FIG. 2 shows an example of an infrastructure code definition 200, which may be included in the infrastructure code definitions 103. The infrastructure code definition 200 is for provisioning a machine named web01, as shown at 201. The infrastructure code definition 200 is referred to as my_apache_server at 202. Options for the web01 machine are described. The type of server is specified. For example, the server may be specified in a description provided in a hardware resource template. The hardware resource template may be in a format usable by one of the computer resource management systems 110 to identify a computing resource from one of the computing resource pools 111 based on the description in the hardware resource template. As shown at 203, the hardware resource template that is specified as "Web Server Template" and may include details about a web server to be provisioned for the computing infrastructure 120. The details may identify a type of server, network components for the server, configuration parameters, location in a rack, and/or other information which may be used to identify and configure the web server. An example of a hardware resource template is a Hewlett Packard Enterprise OneView® template that describes hardware to be provisioned.

At 204, information for an operating system (OS) to be installed on the web01 machine may be specified. The information may identify an OS build template that may describe the type of OS, such as Red Hat Enterprise Linux® (RHEL), version of the OS and version of the server or other type of computer on which it is being installed. According to an example, the OS build template is an OS build plan that may be provided and/or used by Hewlett Packard Enterprise® Insight Control (IC) server provisioning (ICsp).

Other parameters may be specified for the web01 machine, such as host name (shown at 205), whether it enables Dynamic Host Configuration Protocol (DHCP), etc. Also, parameters may be specified that are transferred to the configuration management server 140 to install the configuration management client on the web01 machine. For example, at 206, a password may be specified that is sent to the configuration management server 140. This password is used to log into the web01 machine to install the configuration management client and software applications on the web01 machine.

Figure 3:
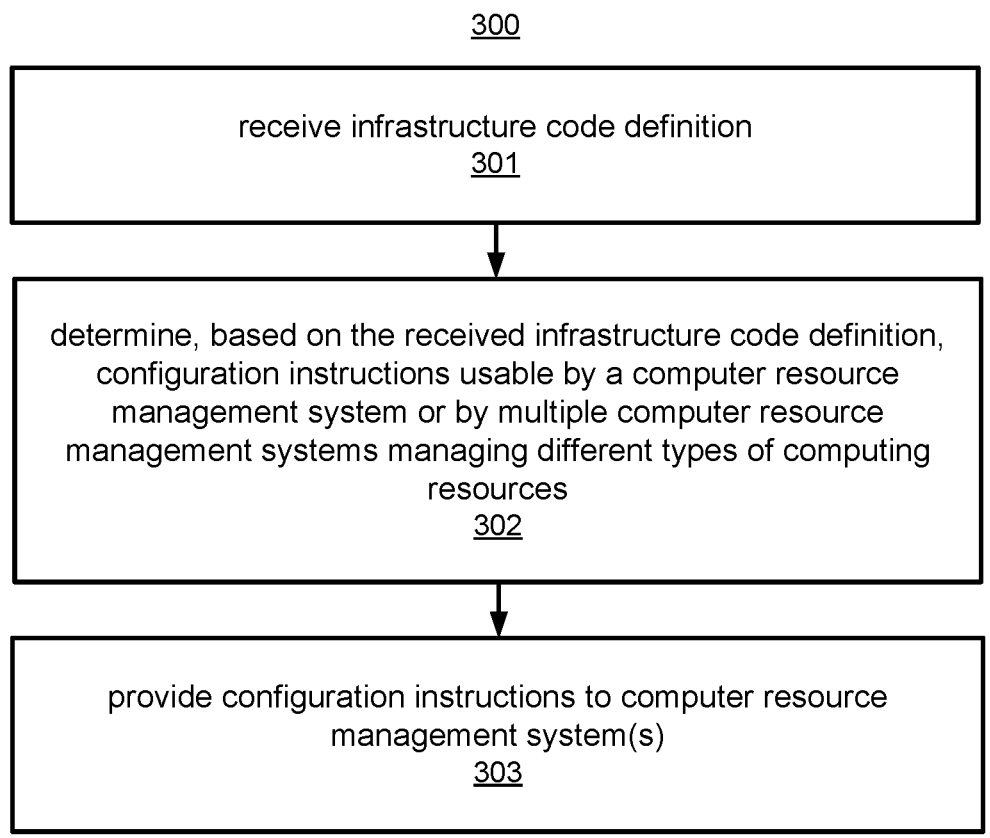
FIG. 3 shows a method for provisioning computing resources, according to an example of the present disclosure.

FIG. 3 illustrates a method 300 for provisioning computing resources, according to an example. The method 300 is described by way of example as being performed by the provisioning management system 100 but may be performed by other systems. At 301, the provisioning management system 100 receives an infrastructure code definition. For example, the provisioning management system 100 receives the infrastructure code definition 103 from the configuration management workstation 101. The infrastructure code definition includes a description of desired computing infrastructure, such as the computing infrastructure 120. The desired computing infrastructure may include computing resources that are to be provisioned. In an example, a user of the workstation 101 creates the infrastructure code definition 103 that describes the desired computing infrastructure. The infrastructure code definition 103 may include multiple infrastructure code definitions.

At 302, the provisioning management system 100 determines, based on the received infrastructure code definition, configuration instructions usable by a computer resource management system or by multiple computer resource management systems (e.g., computing resource management systems 110) managing different types of computing resources. The configuration instructions describe the computing resources to be provisioned, and are provided in a format that can be parsed and operated on by the computer resource management system to identify the computing resources to be provisioned and to provision the identified computing resources.

In an example, the provisioning management system 100 determines configuration instructions, including configuration templates, from the received infrastructure code definition. A configuration template is in a format that can be parsed and operated on by a particular computer resource management system. Examples of configuration templates may include a hardware resource template and an OS build template. For example, the hardware resource template describes computing resource hardware managed by the computing resource management systems 110a. The template is in a format that can be parsed and operated on by the computer resource management system 110a, and includes a description of the computing resource hardware to be provisioned. For example, the hardware resource template may include the "Web Server Template" discussed above with respect to FIG. 2 and may be populated with details about a web server to be provisioned for the computing infrastructure 120. The "Web Server Template" may identify a type of server, network components for the server, configuration parameters, location in a rack, and/or other information which may be used to identify and configure the web server.

The OS build template is in a format that can be parsed and operated on, for example, by the computer resource management system 110b, and is populated with a description of the operating system to be provisioned. For example, the OS build plan template is "RHEL-6.5-x64" shown in FIG. 2, and may describe the type of OS, such as RHEL, version of the OS and version of the server or other type of computer on which it is being installed.

According to an example, the infrastructure code definition 103 is incompatible with the computer resource management systems 110. For example, the computer resource management systems 110 may be able to identify computing resources to provision from instructions that are provided in a format and syntax particular to the computer resource management system, and the infrastructure code definition may not be in that format and syntax. The provisioning management system 100 may parse the received infrastructure code definition to determine configuration templates specified in the infrastructure code definition that are compatible with the computer resource management systems 110. For example, the provisioning management system 100 may determine a compatible configuration template that is in the format and syntax particular to the computer resource management system that is to receive the configuration template.

At 303, the provisioning management system 100 provides the configuration instructions determined at 302 to the computer resource management systems 110 to create computing infrastructure satisfying the desired computing infrastructure. Computing infrastructure 120, satisfying the desired computing infrastructure, may include computing resources, for example, from the computing resource pools 111, which are identified according to computing resource descriptions provided in the configuration instructions. For example, to create computing infrastructure satisfying the desired computing infrastructure, configuration templates, which may include a hardware resource template and an OS build template, are transmitted to the computer resource management systems 110. The computer resource management systems 110 select computing resources that are described in the configuration instructions for provisioning to create the computing infrastructure 120. The selected computing resources are allocated for use for the computing infrastructure 120, so those computing resources become reserved for the computing infrastructure 120. The selected computing resources are provisioned. Provisioning may include configuring hardware for the computing resources, including assigning an IP address, connecting to the hardware to a network, and performing other configuration processes. In an example, after the computing infrastructure nodes 121a-n are deployed, and each node has an OS installed, the configuration management client (shown as 130a-n) may be installed on each of the computing infrastructure nodes 121a-n. Once installed, the configuration management clients 130a-n may communicate with the configuration management server 140 to install software applications on the computing infrastructure nodes 121a-n.

Figure 4:
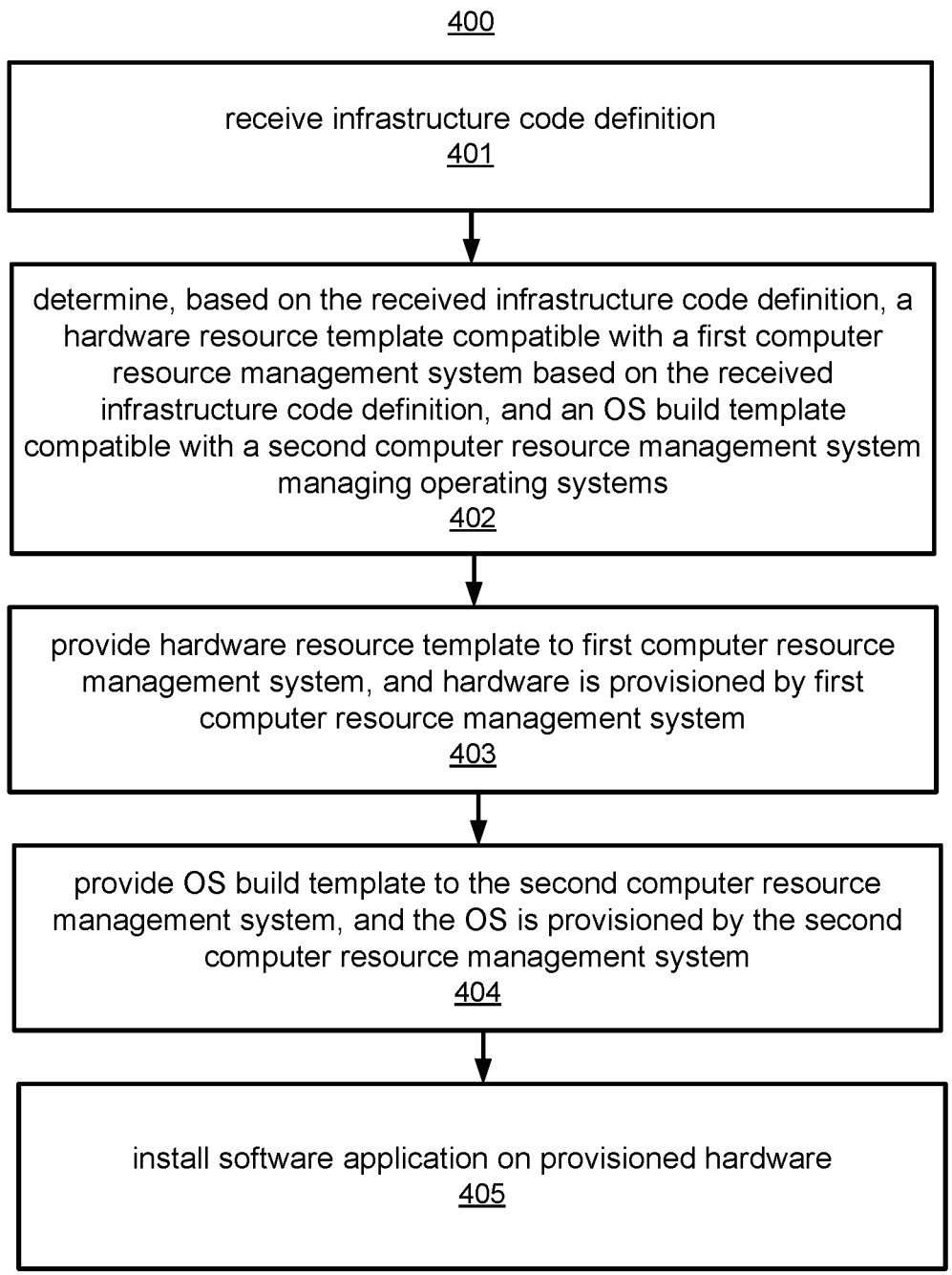
FIG. 4 shows a method for provisioning computing resources, according to another example of the present disclosure.

FIG. 4 illustrates a method 400 for provisioning computing resources, according to an example. The method 400 is described by way of example as being performed by the provisioning management system 100 but may be performed by other systems. The method 400 includes steps that may be steps of the method 300 and/or sub-steps of steps of the method 300.

At 401, the provisioning management system 100 receives an infrastructure code definition 103. The infrastructure code definition 103 includes a description of desired computing infrastructure to be provisioned. At 402, the provisioning management system 100 determines, based on the received infrastructure code definition 103, a hardware resource template compatible with a first computer resource management system (e.g., computing resource management system 110a) managing hardware and determines, based on the received infrastructure code definition, an OS build template compatible with a second computer resource management system (e.g., computing resource management system 110b) managing OSs.

At 403, the provisioning management system 100 provides the hardware resource template to the first computer resource management system, and hardware is provisioned by first computer resource management system. For example, the computer resource management system 110a receives the hardware resource template, and locates and allocates hardware described in the hardware resource template from the computing resource pool 111a. The hardware is configured, for example, based on parameters specified in the hardware resource template, and may be booted up to make it available for installing an operating system. According to an example, the hardware resource template may be stored at the computer resource management system 110a or in a data storage system accessible by the computer resource management system 110a. To provide the hardware resource template to the computer resource management system 110a, the provisioning management system 100 may identify the hardware resource template from the infrastructure code definition 103, and send an identification of the hardware resource template to the computer resource management system 110a. The computer resource management system 110a may retrieve the hardware resource template from data storage based on the received identification of the hardware resource template. A similar process may be performed to provide the OS build template to the computer resource management system 110b.

At 404, the OS build template is provided to the second computer resource management system, and the OS is provisioned by the second computer resource management system. For example, the OS build template may be provided to the computer resource management system 110b, and the computer resource management system 110b installs an OS described in the OS build plan template on the booted up hardware. In an example, the hardware may include a server, and the once the server is booted up, the computer resource management system 110b is notified, and installation of the OS is scheduled. Then, the OS is installed on the server according to the scheduling by the computer resource management system 110b.

At 405, after the OS is installed, a software application may be installed on the provisioned hardware. For example, after the OS is installed, a configuration management client may be installed on the server. Once installed, the configuration management client 130a may communicate with the configuration management server 140 to install a software application, which may be specified in the received infrastructure code definition 103. Multiple software applications may be installed if multiple software applications are specified in the received infrastructure code definition 103.

Figure 5:
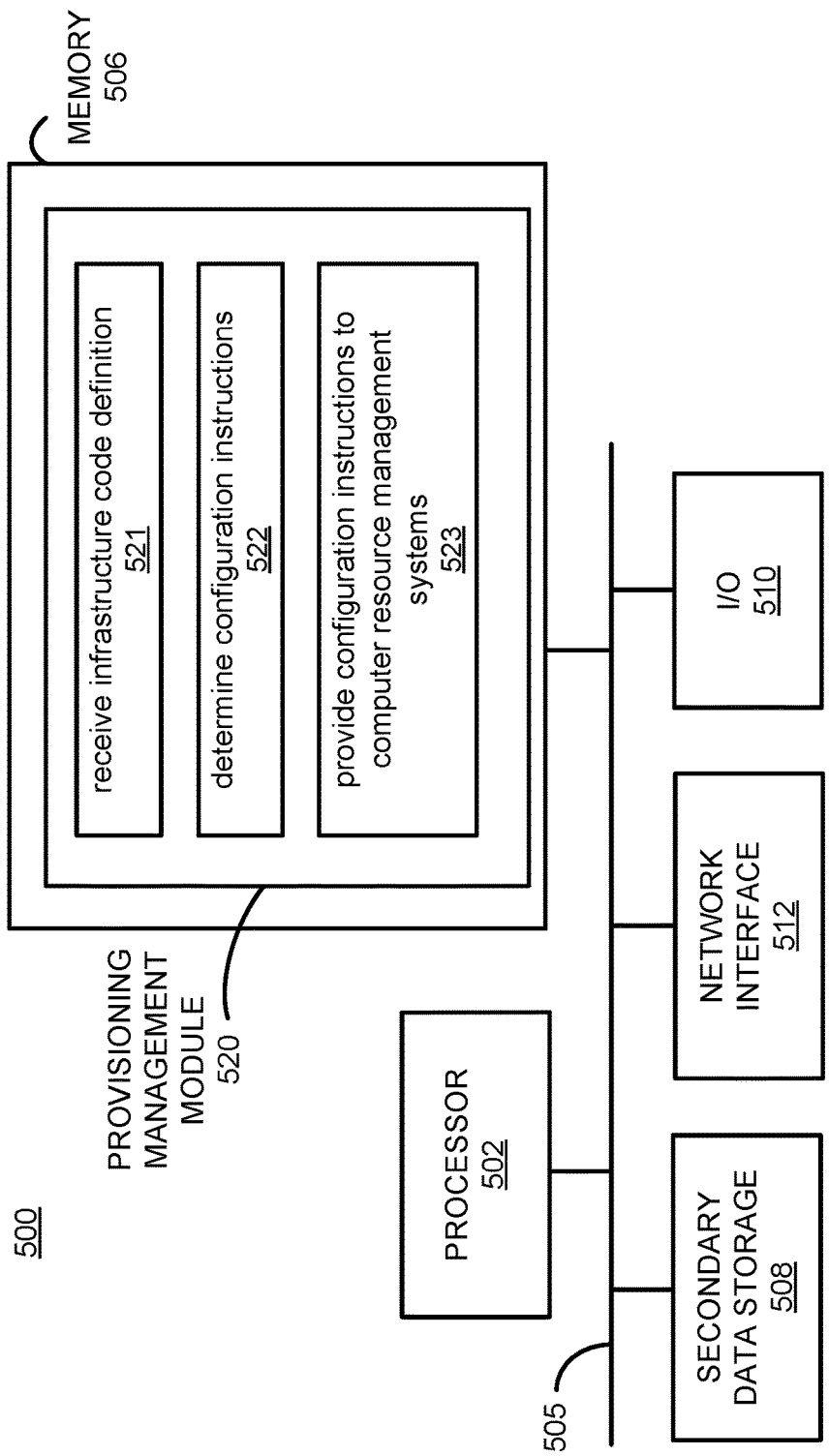
FIG. 5 shows a computer system that may be used as a platform for the provisioning management system, according to an example of the present disclosure.

FIG. 5 shows a computer system 500 that may be used with the examples described herein. The computer system 500 may represent a platform that includes components that may be in a server or another computer system. The computer system 500 may be used as a platform for the provisioning management system 100. The computer system 500 may execute, by a processor (e.g., a single or multiple processors) or other hardware processing circuit, the methods, functions and other processes described herein. These methods, functions and other processes may be embodied as machine-readable instructions stored on a computer readable medium, which may be non-transitory, such as hardware storage devices (e.g., RAM, ROM, EPROM, EEPROM, hard drives, and flash memory).

The computer system 500 may include a processor 502 that may implement or execute machine-readable instructions performing some or all of the methods, functions and other processes described herein. Commands and data from the processor 502 may be communicated over a communication bus 505. The computer system may also include memory 506, such as random-access memory (RAM), where the machine-readable instructions and data for the processor 502 may reside during runtime, and a secondary data storage 508, which may be non-volatile and stores machine-readable instructions and data. The memory and data storage are examples of computer readable mediums. The memory 506 may include a provisioning management module 520 including machine-readable instructions residing in the memory 506 during runtime and executed by the processor 502 to perform the functions and operations of the provisioning management system 100, including functions and operations 521-523. For example, the machine-readable instructions for the provisioning management module 520 may be executable to receive an infrastructure code definition (521), such as infrastructure code definition 103. The machine-readable instructions for the provisioning management module 520 may be executable to determine, based on the received infrastructure code definition 103, configuration instructions usable by computer resource management systems 110 managing pools 111 of different types of computing resources (522). The machine-readable instructions for the provisioning management module 520 may be further executable to provide the configuration instructions to the computer resource management systems 110 to provision computing resources from the pools 111 to create computing infrastructure 120 satisfying the computing infrastructure described in the infrastructure code definition 103 (523).

The computer system 500 may include an I/O device 510, such as a keyboard, a mouse, a display, etc. The computer system may include a network interface 512 for connecting to a network. Other known electronic components may be added or substituted in the computer system.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims, and their equivalents, in which all terms are meant in their broadest reasonable sense unless otherwise indicated.

What is claimed is:

1. A provisioning management system comprising:
a non-transitory computer readable medium storing machine-readable instructions; and
a processor, wherein the processor is to execute the machine-readable instructions to:
receive an infrastructure code definition including a description of a computing infrastructure to be provisioned;
determine, based on the infrastructure code definition, configuration instructions usable by a plurality of computer resource management systems managing pools of different types of computing resources, wherein determining the configuration instructions include parsing the infrastructure code definition to identify a plurality of hardware resource templates compatible with the plurality of computer resource management systems and identify an operating system build template, wherein the operating system build template includes type of the operating system, version of the operating system, and version of a server on which the build template is installed; and
provide the configuration instructions to the plurality of computer resource management systems to provision computing resources from the pools of different types of computing resources to create computing infrastructure satisfying the computing infrastructure described in the infrastructure code definition, wherein providing the configuration instructions comprises:
providing at least one of the plurality of hardware resource templates to a first of the plurality of computer resource managements systems; and
providing the operating system build template to a second of the plurality of computer resource management systems.

2. The provisioning management system of claim 1, wherein the processor is to execute the machine-readable instructions to:
install a configuration management client on the created computing infrastructure, wherein the configuration management client communicates with a configuration management server to install a software application on the created computing infrastructure.

3. The provisioning management system of claim 1, wherein the plurality of computer resource management systems comprise a first computer resource management system managing computing resource hardware, and a second computer resource management system managing operating systems, and to determine the configuration instructions, the processor is to:
determine a hardware resource template describing hardware managed by the first computer resource management system; and
determine an operating system build template describing an operating system managed by the second computer resource management system.

4. The provisioning management system of claim 3, wherein the processor is to:
provide the hardware resource template to the first computer resource management system to provision hardware for the computing infrastructure; and
provide the operating system build template to the second computer resource management system to provision an operating system for the computing infrastructure.

5. The provisioning management system of claim 1, wherein the processor is to execute the machine-readable instructions to:
parse the infrastructure code definition to determine configuration templates that are compatible with at least one of the plurality of computer resource management systems to provision the computing infrastructure.

6. A processor-implemented method comprising:
receiving, at a processor, an infrastructure code definition including a description of computing infrastructure to be provisioned;
determining, by the processor, based on the infrastructure code definition:
configuration instructions comprising a hardware resource template compatible with a first computer resource management system managing hardware, wherein determining the configuration instructions include parsing the infrastructure code definition to identify the hardware resource template and an operating system build template from the infrastructure code definition; and
the operating system build template compatible with a second computer resource management system managing operating systems, wherein the operating system build template includes type of the operating system, version of the operating system, and version of a serve on which the build template is installed;
providing, by the processor, the hardware resource template to the first computer resource management system, wherein the first computer resource management system locates and allocates hardware based on the hardware resource template from computing resources managed by the first computer resource management system; and
providing, by the processor, the operating system build template to the second computer resource management system, wherein the second computer resource management system determines when the allocated hardware is booted up and is available for installation of an operating system, and installs an operating system on the allocated hardware based on the operating system build template.

7. The method of claim 6, wherein the hardware resource template describes hardware to be provisioned, and the first computer resource management system locates and allocates hardware matching the hardware described in the hardware resource template.

8. The method of claim 6, wherein the operating system build template describes an operating system to be provisioned, and the second computer resource management system installs the operating system described in the operating system build template on the allocated hardware.

9. The method of claim 6, comprising: installing a configuration management client on the hardware after the operating system is installed, wherein the configuration management client communicates with a configuration management server to install a software application on the created computing infrastructure.

10. The method of claim 6, wherein providing the hardware resource template to the first computer resource management system comprises:
communicating with the first computer resource management system through an application program interface for the first computer resource management system to provide the hardware resource template to the first computer resource management system.

11. The method of claim 6, wherein providing the operating system build template to the second computer resource management system comprises:
communicating with the second computer resource management system through an application program interface for the second computer resource management system to provide the operating system build template to the second computer resource management system.

12. A non-transitory computer readable medium storing machine-readable instructions executable by a processor to:
receive an infrastructure code definition including a description of computing infrastructure to be provisioned;
parse the infrastructure code definition to determine a hardware resource template and an operating system build template usable by at least two computer resource management systems to provision a computing infrastructure; and
provide the hardware resource template to a first of the two computer resource management systems and the operating system build template to a second of the two computer resource management systems to provision hardware for the computing infrastructure based on the hardware resource template and to provision an operating system for the computing infrastructure based on the operating system build template, wherein the operating system build template includes a type of the operating system, a version of the operating system, and a version of a server on which the build template is installed.

13. The non-transitory computer readable medium of claim 12, wherein the processor is to:
send instructions to install a configuration management client on the provisioned hardware after the operating system is installed on the provisioned hardware, wherein the configuration management client communicates with a configuration management server to install a software application on the provisioned hardware.

14. The non-transitory computer readable medium of claim 12, wherein the hardware resource template describes hardware to be provisioned by the first computer resource management system, and the operating system build template describes an operating system to be provisioned by the second computer resource management system different from the first computer resource management system.

* * * * *